March 20, 1951 F. H. M. HART 2,546,124
RECORD STRIP MAGAZINE AND MOUNTING
Filed Jan. 31, 1946 3 Sheets-Sheet 1
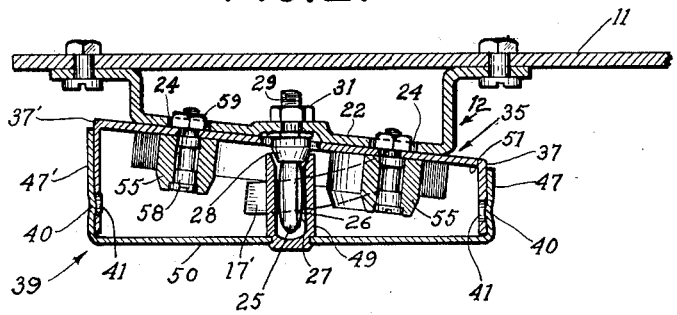
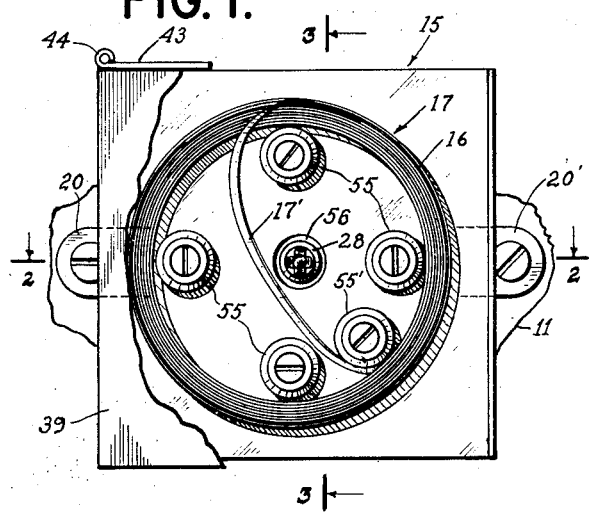
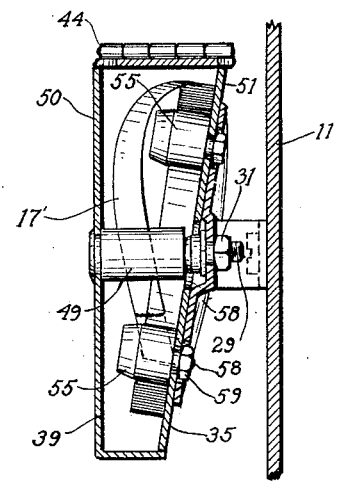
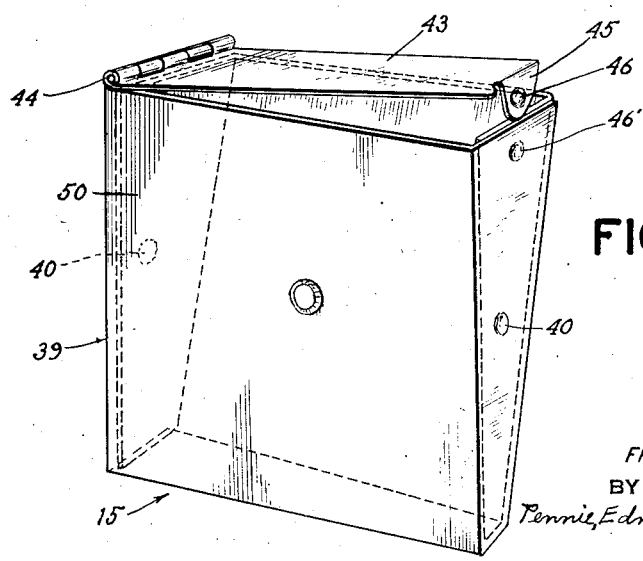
INVENTOR
FREDERICK H. M. HART.
BY
Pennie, Edmonds, Morton and Barrows
ATTORNEYS March 20, 1951  F. H. M. HART  2,546,124
RECORD STRIP MAGAZINE AND MOUNTING
Filed Jan. 31, 1946  3 Sheets-Sheet 2
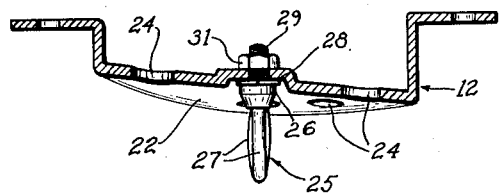
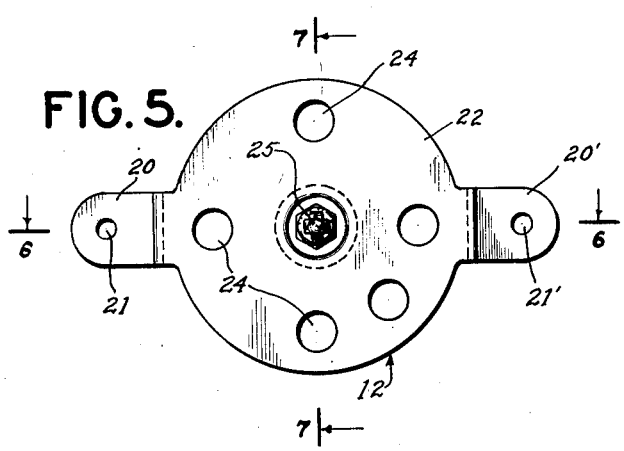
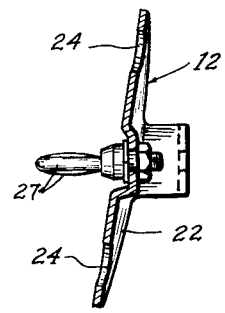
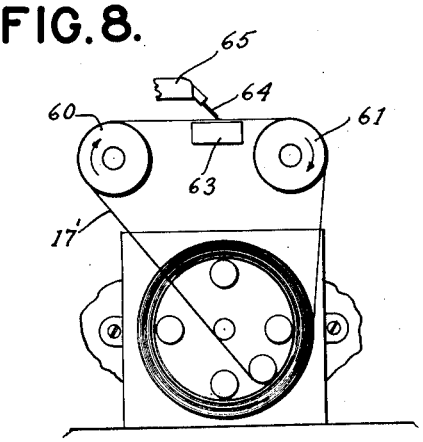
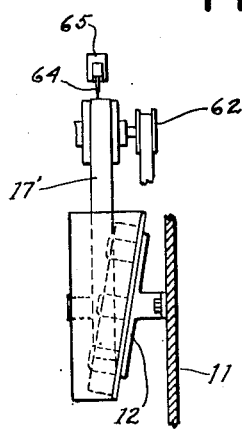
INVENTOR
FREDERICK H. M. HART.
BY
Pennie, Edmonds, Morton and Barrows
ATTORNEYS March 20, 1951 F. H. M. HART 2,546,124
RECORD STRIP MAGAZINE AND MOUNTING
Filed Jan. 31, 1946 3 Sheets-Sheet 3

INVENTOR.
FREDERICK H.M. HART.
BY
Pennie, Edmonds, Morton and Barrows
ATTORNEYS

Patented Mar. 20, 1951

2,546,124

UNITED STATES PATENT OFFICE 2,546,124

RECORD STRIP MAGAZINE AND MOUNTING

Frederick H. M. Hart, Poughkeepsie, N. Y., assignor, by mesne assignments, to Recordgraph Corporation, a corporation of Delaware Application January 31, 1946, Serial No. 644,489

6 Claims. (Cl. 88—18.7)

This invention relates to a demountable magazine adapted to hold a coiled endless strip, such as may be employed, for example, as a record medium in sound recording and reproducing apparatus, and to mounting means therefor.

An endless strip bearing a sound track or employed for other purposes requiring that the strip, in use, be advanced longitudinally, is conveniently coiled into a roll from which the strip may be continuously withdrawn at the innermost coil thereof and to which the strip may be continuously returned at the outermost coil. This arrangement requires that there be an uncoiled section of the strip connecting inner and outer coils of the roll and effectively crossing over the body of the roll on one side of the center thereof. When the roll is arranged for storage this crossover section may be relatively short, whereas when the roll is mounted on the apparatus which includes the means for driving the strip, this section will be extended for engagement with the driving means and to provide a section of the strip on which the recording or like means may act.

Because in its passage from the innermost to the outermost coil the strip crosses the body of the roll, it must leave the inner coil at an angle to the end face of the roll and the general direction in which it is advanced external to the roll will be at an angle to the plane of such face. When, therefore, the strip is advanced by rotative means, the axis of rotation of such means will be in non-parallel relation to the axis of the roll. This skewed relation of the roll and driving axes and of the uncoiled section of the strip to the body of the roll has, in prior art arrangements, made the transferal of an unconfined, coiled endless strip from storage means to the apparatus where it is employed, both awkward and time-consuming, particularly since care has had to be taken to prevent the roll from becoming uncoiled in the process.

The present invention avoids the above and other disadvantages inherent in prior art arrangements by providing a demountable magazine of a novel design for holding the coiled strip. This magazine is adapted to be removably attached to a fixed mounting on the apparatus in a position suitable for withdrawing and extending the connecting section of the strip, between inner and outer coils, in automatic alignment with the driving means, the strip at all times being confined within the walls of the magazine and prevented from becoming uncoiled. The magazine also serves as a protective container for storing and shipping the film.

The invention is not limited as to the material of which the coiled strip is composed or as to the use to which it is put. In the application of the invention to sound recording and reproduction apparatus, motion picture film is one medium which may be employed either in an uncoated state for mechanically forming a sound track in the film or with a sensitized emulsion coating for photographic recording, the latter use being in combination with or distinct from the use of the film as a picture medium, as may be desired.

It is an object of the invention to provide means for readily mounting a coiled endless strip on associated apparatus in suitable alignment with driving means therefor.

It is another object to provide a magazine for a coiled endless strip which may readily be mounted on and removed from associated strip-utilizing apparatus.

Another object is to provide a demountable magazine for a coiled endless strip, such as of motion picture film, together with cooperative magazine mounting means whereby the strip may readily be mounted in alignment with strip driving and guiding means.

Another object of the invention is to provide a demountable film magazine and frictional mounting means therefor wherein said magazine includes a rotatable support for a coiled endless film loop.

Another object is to provide a magazine having stationary support means and a mounting therefor having rotatable support means for a coiled endless strip, cooperative to transfer support of the coiled strip from stationary to rotatable means upon engagement of the magazine and mounting.

Another object is to provide an enclosed magazine for storing a coiled endless strip which may be readily mounted on associated apparatus with the strip suitably supported for driving and from which the section of the strip joining inner and outer coils thereof may readily be withdrawn for engagement with driving and guiding means without danger of the strip becoming uncoiled.

A further object is to provide a substantially enclosed film magazine for storing a coiled endless film loop which may be demountably attached to associated apparatus and which has window means, together with closure means therefor, for the withdrawal of a portion of the loop in use.

Other objects and advantages will become apparent as the description proceeds.

According to its general features, the invention provides an enclosed magazine of shallow box-like construction having opposite principal walls at an acute angle one to the other to form a variable-depth container the least depth of which is only slightly greater than the width of the enclosed coiled strip, with a deeper portion of the magazine providing space for the uncoiled cross-over section between inner and outer coils of the strip. The magazine is formed of separable telescoping front and rear sections, such as of sheet material. The front section is removably held to the rear section by detent means and has a hinged top portion providing means for uncovering an opening to accommodate the exteriorly extended strip when the magazine is mounted on the apparatus with which it is associated, and for closing said opening to form a substantially enclosed container for storage purposes. Separable frictional holding means are provided for detachably mounting the magazine on a mounting plate having a surface angularly disposed for suitably locating the magazine and strip with respect to driving and guide members of the apparatus.

In one embodiment the rear section of the magazine mounts a plurality of rollers disposed about a circle and adapted to support the coiled strip at the innermost coil thereof for rotation about the common axis of the coils. In another embodiment the coiled strip initially is supported in the magazine at the innermost coil by a plurality of fixed pins and support of the strip is transferred, automatically, to rollers carried by the mounting plate as the magazine is mounted thereon.

The invention will be better understood from consideration of the following detailed description, taken in connection with the accompanying drawings in which:

Fig. 1 is a front elevational view of one form of the magazine and mounting means of the invention, showing the mounting means secured to a panel of associated apparatus and with the front section of the magazine broken away to show a coiled endless strip supported in the magazine;

Fig. 2 is a view in section along the line 2—2 of Fig. 1 with the front section of the magazine in place;

Fig. 3 is a sectional view taken along the line 3—3 of Fig. 1, likewise with the front section of the magazine in place;

Fig. 4 is a perspective view of the magazine, per se;

Fig. 5 is a front elevational view of the magazine mounting plate of Fig. 1 showing a frictional mounting stud for holding the magazine engaged with the plate;

Figure 11:
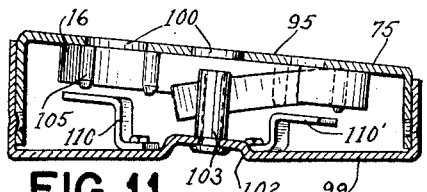
Figure 13:
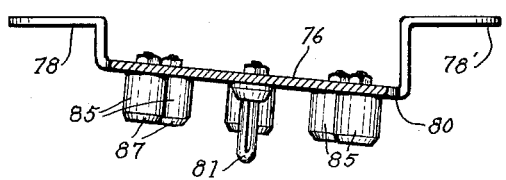
Figure 10:
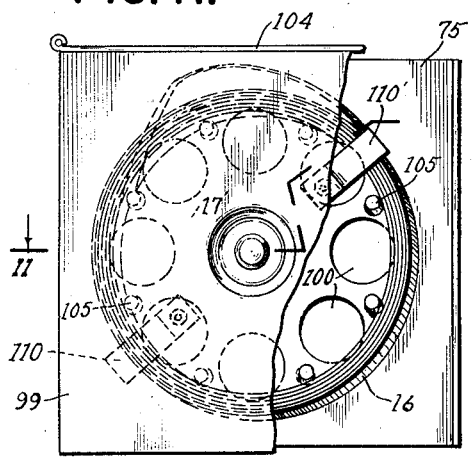
Figure 12:
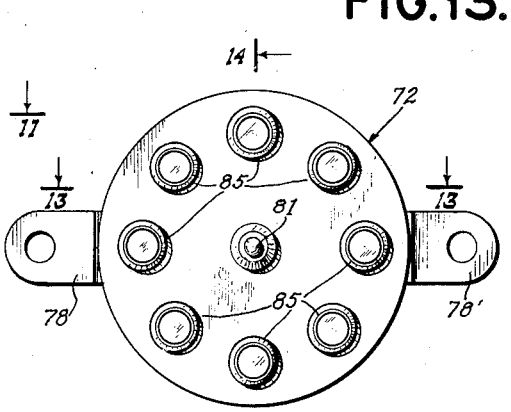
Figure 15:
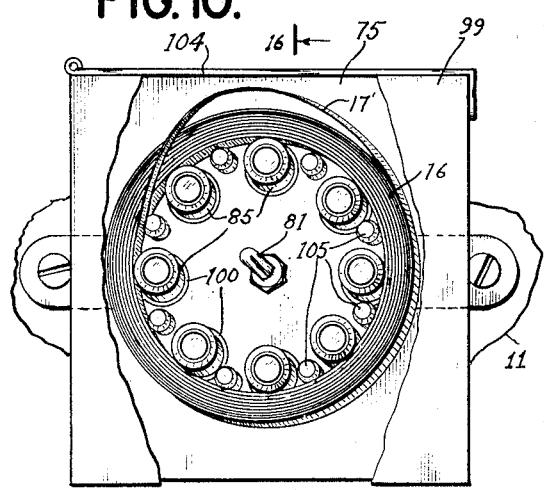
Figure 16:
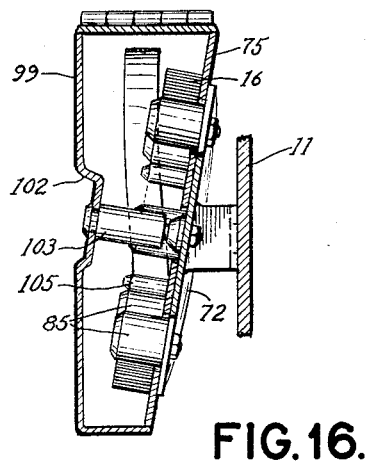
Figure 14:
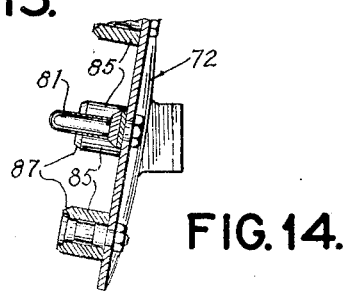

Figs. 6 and 7 are sectional views taken along the lines 6—6 and 7—7, respectively, of Fig. 5;

Fig. 8 is a diagrammatic front view showing the relation of the magazine and record strip to driving and recording means in associated sound apparatus;

Fig. 9 is an end view corresponding to Fig. 8;

Fig. 10 is a front elevational view of a modification of the magazine of Fig. 1, in which fixed pins are substituted for rollers as the support means for the coiled strip, with a portion of the front section thereof broken away to show a coiled endless strip supported therein;

Fig. 11 is a section along the line 11—11 of Fig. 10;

Fig. 12 is a front elevational view of a mounting plate for the magazine of Fig. 10, including strip-supporting rollers and a frictional mounting stud;

Fig. 13 is a top view of the mounting plate of Fig. 12, in section along the line 13—13 of that figure;

Fig. 14 is a section along the line 14—14 of Fig. 12;

Fig. 15 is a front elevational view of the magazine of Figs. 10 and 11 mounted on the plate of Figs. 12-14 showing a coiled endless strip supported on the rollers of the mounting plate;

Fig. 16 is a sectional view taken along the line 16—16 of Fig. 15.

Referring first to the embodiment of the invention shown in Figs. 1–9, numeral 11 is applied to a panel which may, for example, be a structural member of a sound recording and/or reproducing device, to which is secured a mounting plate 12, adapted to mount, as will be described, a magazine 15 containing a roll 16 of record material 17 in strip form, such as motion picture film, with the innermost and outermost coils of the roll joined by a loose or uncoiled section 17' to form an endless loop. Section 17' of the film is adapted to be extended in use to engage driving means, one driving arrangement being illustrated in Figs. 8 and 9. Such an endless loop may, for purposes of recording on both surfaces of the film, include a reverse twist in the uncoiled section 17' thereof or by the omission of such twist one surface, only, of the strip may be employed for recording purposes, both arrangements being known and used in the art.

Mounting plate 12, as best seen in Figs. 5 to 7, has mounting lugs 20, 20' with holes 21, 21', respectively, therein. Lugs 20, 20' are coplanar and extend from perpendicular sections joining the lugs to a body section 22 of circular form, the principal portion of which is disposed in a plane making an acute angle with the planar base formed by the lugs and also both with their common axis and with an axis perpendicular thereto in the plane of said base. This angular disposition of the mounting plate is clearly seen in the sectional views of Figs. 6 and 7, as well as in the assembly of mounting plate and magazine shown in Figs. 2 and 3.

Mounting plate 12 has a plurality of holes 24 arranged about the circumference of a circle concentric with the contour of body section 22 of the plate, adapted to receive in loose engagement members projecting from magazine 15, to be referred to later. On a central portion of body section 22, indented to parallelism with the plane of lugs 20, 20', is mounted a friction stud or pin 25, of a well-known type, adapted for frictional engagement with a hollow post. Pin 25 has a solid core 26 surrounded by a structure comprising a plurality of resilient leaves 27. An enlarged portion of core 26 forms a shoulder 28, and an end portion 29 is threaded to receive a nut 31 for holding the pin to mounting plate 12, with the shoulder in engagement therewith.

Magazine 15 preferably comprises a pair of separable sections which may be of sheet metal, including a rear section 35 having lateral flanges 37, 37' forming a member of generally U-shaped horizontal cross-section open top and bottom, and a front section 39 of box construction fitting over flanges 37, 37' and held in place by the resilient engagement of a pair of detent means comprising raised sections 40 in the front section and holes 41 in flanges 37, 37' of the rear section, respectively. The magazine may, for convenience, be described with reference to the position in which it is illustrated in Fig. 4 as being bounded by top, bottom, front lateral, rear lateral, right lateral and left lateral walls, these terms also being used in connection with component parts thereof.

The top wall of the magazine is formed by a hinged cover member 43, best seen in Fig. 4, constituting a part of the separable front section 39 of the magazine and attached thereto by a hinge 44. This member may be swung from its closed position in a counterclockwise direction through approximately 270 degrees to rest against the left lateral wall of the magazine and uncover an opening at the top of the magazine for the exteriorly extended section of the film. To provide a substantially enclosed container for storing the film, cover 43, which as a downwardly projecting tab 45 opposite hinge 44, may be swung to a closed position and held by the engagement of detent means 46 in the tab and 46' in the wall of section 39.

The two flanges 37, 37' of rear section 35 are preferably of unequal width in any horizontal plane through section 35 and tapered in width from top to bottom, to the end that the respective front edges thereof may lie in a plane substantially parallel to that of members 20, 20' of mounting plate 12, when the magazine is mounted on the plate with the rear surface thereof in contact with inclined section 22 of the plate. The right and left lateral walls 47, 47' of front section 39 are likewise preferably of unequal width in any horizontal plane intersecting section 39 and tapered from top to bottom, so that with the front lateral wall 50 of section 39 positioned against the front edges of flanges 37, 37', walls 47, 47' are substantially coextensive with said flanges. Correspondingly, the bottom wall of front section 39 and the hinged cover member 45 both decrease in width from left to right so as to extend substantially between the edges of flanges 37, 37' and the rear lateral wall of the magazine. A hollow post or socket 49 centrally mounted on and projecting inwardly from front lateral wall 50 of cover 39, and normal thereto, is adapted to fit over pin 25 on mounting plate 12 and to be held thereto by friction due to compression of the assembly of leaves 27 of the pin structure.

On the rear lateral wall 51 of rear section 35 of the magazine are mounted four film-retaining rollers 55 and a guide roller 55'. Rollers 55 are shown as spaced at 90 degrees about the circumference of a circle of radius equal to that of the circle of holes 24 in plate 12 and may be located on the principal axes of the base, while roller 55', preferably located at substantially the same radius and of the same diameter as the other rollers, is intermediate the lower and right-hand rollers 55, thus being in a position where the depth of the magazine between front and rear lateral walls thereof approaches a minimum for the region of the space circumscribed by the innermost coil of the coiled strip. Rollers 55, 55' are rotatably mounted on wall 51 by threaded studs 58 and nuts 59, the axes of the studs and rollers being perpendicular to said wall. Wall 51 has a centrally located hole 56 through which pin 25 of the mounting plate assembly may extend to engage hollow post 49.

With the magazine seated on mounting plate 12, nuts 59 fit loosely in holes 24 and prevent the magazine from twisting about the axis of pin 25. The roll 16 of coiled film or other record material 17 is supported by rollers 55 and 55' at the innermost coil thereof for rotation about the axis of the roll, which is the common axis of the coils, and this axis preferably is perpendicular to the rear lateral wall 51 of the magazine and to inclined section 22 of mounting plate 12 when the magazine is mounted thereon. The axis of the roll in the embodiment of the invention thus far described is, therefore, at an angle to the axis of mounting pin 25 determined by the inclination of section 22 of mounting plate 12 to the plane of members 20, 20' of the mounting plate.

The coiled section 17' of film 17, joining the innermost and outermost coils of the roll, departs from the inner coil at guide roller 55' where the depth of the magazine between front and rear lateral walls thereof is only slightly greater than the width of the film and is substantially a minimum for the space circumscribed by the roll and crosses over the body of the roll, on the opposite side of the center thereof, at a position where the depth of the magazine is considerably greater than at roller 55' to permit of such cross-over. When the strip is arranged for storage in the magazine, this section of film 17 continues within the confines of the magazine to join the outermost coil of the roll at a location of reduced depth of the magazine. When magazine 15 is mounted on plate 12 and the film is arranged for recording or reproduction, the uncoiled film section is extended as seen in Figs. 8 and 9 to pass over idler roller 60 and driving roller or sprocket 61, rotated by pulley means 62 and over an intermediate support, such as platen 63, where a recording or play-back stylus or both, such as stylus 64 carried by sound head 65, may indent or follow a sound track, as the case may be, or where suitable optical means may be located if photographic recording is used. The film rejoins the roll, as before, at a location of reduced depth of the magazine.

By removing front section 39 of the magazine, a roll of the record strip may readily be placed over the rollers 55 and roller 55', which may have beveled end portions to facilitate this operation. Thereafter with the front section in place, telescoped over flanges 37, 37', only the engagement of pin 25 with hollow post 49 and the seating of the magazine against the mounting plate is required to locate the roll of coiled film at the proper angle to the axis of the drive and guide rollers. With this done connecting section 17' of the roll may be extended through the window in the magazine, uncovered by swinging back hinged cover 43, and the film engaged with the driving and guiding means without danger of the roll becoming uncoiled. When recording or reproduction has been completed, the section of film exterior to the magazine may be pushed back into the magazine and with cover 42 closed and latched, the film is prepared for storage or transportation.

A modification of the invention according to which the film roll is supported on stationary means within the magazine when the latter is detached from the mounting plate and the support of the roll transferred to rollers carried by the mounting plate when the magazine is placed thereon, is shown in Figs. 11 to 16. Referring first to Figs. 15 and 16 there is shown a mounting plate 72 attached to panel 11 of associated sound recording and reproducing apparatus, with a magazine 75 containing film roll 16 in place thereon. Mounting plate 72, as best seen in Figs. 12 to 14, is similar to mounting plate 12 of the previously described modification of the invention, in that it comprises a pair of mounting lugs 78, 78' forming a planar base and attached by perpendicular sections to an inclined portion 80 which serves, as in the case of previously described plate 12, to locate the magazine and film in suitable position for the withdrawal of a section of the film strip therefrom and its engagement with driving and guiding means.

Mounting plate 72 also carries a friction stud or pin 81 which structurally may be similar to pin 25 on mounting plate 12. In the present instance, however, pin 81 is positioned with its axis perpendicular to the inclined surface of the circular portion of the mounting plate instead of perpendicular to the base of the plate as in the previously described modification of the invention. Plate 72 is shown as mounting eight rollers 85 rotatable about axes perpendicular to the inclined portion of the mounting plate and disposed about the circumference of a circle having its center at pin 81 to provide a rotatable working support for the film roll. Rollers 85 have respective end portions 87 thereof beveled between sections of major and minor diameter to facilitate the sliding of a roll of film axially over the rollers, as will be described. The rollers are so located that a circle circumscribing them at their sections of major diameter would have substantially the same diameter as the diameter of the innermost coil of the film roll.

Referring now more particularly to Figs. 10 and 11, magazine 75 is shown as comprising a pair of separable sections, including a rear section 95 and a front section 99 similar in form, respectively, to sections 35 and 39 of previously described magazine 15. Front section 99 of magazine 75 differs from front section 39 of magazine 15 in that it has a central portion 102 indented to parallelism with the rear wall of the magazine, on which hollow post 103, corresponding to post 49 of magazine 15, is mounted with the axis of the post perpendicular to the plane of the indented portion and to the rear wall of the magazine. Section 99 carries a hinged cover member 104 corresponding to cover 43 of magazine 15.

Rear section 95 differs from rear section 35 of the previously described modication of the magazine in having a plurality of apertures 100 adapted to admit rollers 85 of the mounting plate assembly within the magazine when the magazine is in place on the mounting plate. Also, there is mounted on the rear wall of magazine 75 a plurality of pins 105 adapted to support film roll 16 internally thereof. Pins 105 are located on the circumference of a circle and intermediate apertures 105.

To the end that a film roll of a particular inner diameter may have a slightly looser or less distorted fit over pins 105 than over rollers 85 and may be guided by the beveled end portions of rollers 85 as the magazine is placed on the mounting plate, the array of pins 105 is such that a circumscribing circle would have a diameter slightly less than that of the aforementioned circumscribing circle of the array of rollers 85 at their sections of major diameter but greater than that of a circle circumscribing the rollers at their sections of minor diameter, that is, at the exposed ends of the rollers. In practice an outer diameter of the pin array which is of the order of 0.020 inch less than the diameter of the roller array, measured at the sections of major diameter of the rollers, has been found satisfactory.

Attached to the front wall of the magazine is a pair of guard bracket 110, 110' having respective portions thereof extending in a plane substantially parallel to the rear wall of the magazine and spaced therefrom a distance somewhat greater than the width of the film, to the end that with a roll of film in place on pins 105, substantial axial displacement of the roll, or of a complete coil thereof, is prevented.

In placing magazine 75, with an endless roll of film 16 therewithin supported on pins 105, upon its mounting plate 72, hollow post 103 of the magazine is first engaged with friction stud 81 of the mounting plate and the magazine then moved along the common axis of the stud and post, until the rear wall of the magazine is seated on the inclined portion of the mounting plate. During this process rollers 85 enter the magazine through apertures 100 and film roll 16 first engages the beveled end portions of rollers 85 at the innermost coil of the roll and then slides over the body portions of the rollers and is rotatably supported thereby. The film roll is slightly distorted or displaced in position, or both, as it slides over the beveled portions of the rollers due to the described difference in diameters of the circumscribing circles of rollers 85 and pins 105, respectively, to transfer support of the roll from the pins to the rollers for rotatably supporting the film roll upon the latter members.

To facilitate transfer of the roll from one support to another, uncoiled section 17' of the film strip instead of departing, more or less abruptly, from the innermost coil of roll 16, and in a direction normal thereto, at a guide member, as, for example, at guide roller 55' of Fig. 1, preferably, in the present modification, both when supported on pins 105 and on rollers 85 is arranged to depart gradually from the innermost coil laterally of the film while retaining contact over a portion of its surface with said coil, until finally lateral clearance is attained and the uncoiled section can cross the body of the film roll. This lateral departure of section 17' from a co-planar relationship with the innermost coil of the roll preferably starts at a location where the depth of magazine 75, between front and rear lateral walls thereof, is a minimum, for the space circumscribed by said inner coil, and the film crosses the body of the roll at a location of considerably greater depth of the magazine. Guard strips 110, 110' may be located about the circumference of the roll and laterally thereof to accommodate the lateral departure of uncoiled section 17' from the roll but still prevent the roll from being displaced axially, off pins 105, as the support of the roll is transferred to rollers 85 in the placing of the magazine on the mounting plate and when the roll is rotated on rollers 85, in use. It will be understood that for advancing the film, extended uncoiled section 17' thereof may be engaged with driving means, such as the means of Figs. 8 and 9.

There has been disclosed herein a demountable enclosed magazine for a coiled endless strip providing a permanent support and confining means for said coiled strip, and a mounting for said magazine adapted to be secured in fixed relation to driving means and in turn to position the magazine and the strip therein for suitable driving engagement of the strip with said driving means.

Since various modifications of the invention not herein described or illustrated are possible without departing from the spirit thereof, the present disclosure is to be taken as illustrative only and not as limiting the invention, the scope of which is defined in the appended claims.

I claim:

1. In combination a magazine having an array of means externally bounded by a circle and adapted to support a coiled strip at the innermost coil thereof, a mount for said magazine having a similar array of means bounded by a circle of slightly greater diameter than that of said first circle, and means including separable means respectively carried by the magazine and mount for locating said magazine in contact with said mount with said two arrays in coaxial relation and substantially axially coincident.

2. In combination, a magazine for a coiled endless film loop, said magazine having a plurality of internal stationary means in circular array adapted to engage and to support said loop externally of said stationary means, a mount for said magazine having a plurality of rotatable means in circular array adapted to rotate about parallel axes and to support said loop for rotation about the axis of the coils thereof, and means for locating said magazine and mount with said two arrays in coaxial and substantially axially coincident relation and with respective members of the two arrays spaced circumferentially, said array of rotatable means having a circumscribing circle of slightly greater diameter than that of the circumscribing circle of said array of stationary means, whereby when the magazine with said loop supported by said stationary means is engaged with its mount and located in the said manner relative thereto support of the loop is transferred to said rotatable means.

3. In combination a magazine for storing an endless strip in roll form, and means for demountably supporting said magazine, said magazine comprising a substantially enclosed box-like container, a circular array of pins mounted therein having parallel axes and adapted to support said roll at the innermost coil thereof and one part of separable two-part frictional holding means, said magazine supporting means comprising a member having a planar base and an opposite exterior surface inclined at an acute angle thereto seating said magazine and a circular array of rotatable cylindrical members extending from said inclined surface with their axes respectively perpendicular thereto, said rotatable members having corresponding end portions beveled from a section of major diameter to one of minor diameter and said pin array having a circumscribing circle of lesser diameter than the circumscribing circle of said cylindrical members at said section of major diameter thereof.

4. In combination a magazine for a coiled strip comprising a box-like container having apertures circularly disposed in a wall thereof, pins in circular array intermediate said apertures adapted to support said strip at the innermost coil thereof and one part of separable two-part locating means, and magazine mounting means including a support with rollers mounted thereon in parallel circular array adapted to support said strip in like manner and the mating part of said two-part means, said rollers being adapted and arranged for entrance within said magazine through said apertures as the magazine is engaged with said mounting means and located relative thereto by engagement of said two-part means, to constitute a support for said strip alternative to said pins.

5. In combination a film magazine comprising front lateral and rear lateral walls at an acute angle one to another to accommodate and to confine a coiled endless film loop therebetween, a circular array of pins mounted internally of the magazine on said rear wall and adapted to support said loop internally thereof, said wall having apertures concentrically circularly disposed intermediate said pins, and a mount for said magazine comprising means for locating the magazine relative thereto and a circular array of rollers having parallel rotative axes normal to the plane of said rear wall when the magazine is seated on the mount, said roller array having a greater diameter than said pin array and said apertures admitting the several members of said roller array to the magazine to constitute a support for said coiled loop alternative to said pins.

6. In combination a film magazine comprising enclosing walls, one of said walls mounting a circular array of pins normal thereto adapted to support a coiled strip at the innermost coil and having apertures circularly disposed intermediate said pins, and a guided member having an axis parallel the pin axes, and a mount adapted to seat said magazine comprising a guide for said member and a circular array of rollers having parallel axes adapted similarly to support said strip, the axes of said guide and rollers all being normal to the plane of said one wall when the magazine is seated on the mount, said roller array being of slightly greater diameter than said pin array and arranged to pass through said apertures as the magazine is seated on the mount, whereby support of a coiled strip may be transferred from said pins to said rollers as the magazine is advanced toward the mount in the direction of said several parallel axes.

FREDERICK H. M. HART.

REFERENCES CITED

The following references are of record in the file of this patent:

UNITED STATES PATENTS

| Number | Name | Date |
|---|---|---|
| 1,125,729 | Salmon | Jan. 19, 1915 |
| 1,757,772 | Johnson | May 6, 1930 |
| 2,115,503 | Von Mihaly | Apr. 26, 1938 |
| 2,120,724 | Williams | June 14, 1938 |
| 2,166,079 | Ricchiardi | July 11, 1939 |
| 2,183,117 | Daniel | Dec. 12, 1939 |
| 2,198,644 | Wettengel | Apr. 30, 1940 |
| 2,217,036 | Williams | Oct. 8, 1940 |
| 2,238,719 | De Tartas | Apr. 15, 1941 |
| 2,279,022 | Duskes | Apr. 7, 1942 |
| 2,323,215 | Gilman et al. | June 29, 1943 |
| 2,327,108 | Heyer | Aug. 17, 1943 |

FOREIGN PATENTS

| Number | Country | Date |
|---|---|---|
| 466,058 | Great Britain | May 21, 1937 |
| 679,133 | Germany | July 29, 1939 |
| 216,698 | Switzerland | Jan. 5, 1942 |